United States Patent Office 3,839,406
Patented Oct. 1, 1974

3,839,406
PROCESS FOR PRODUCING
DIAMINOMALEONITRILE
Kenji Hara, Yachiyo, Eiji Nishiwaki, Arai, Shigeharu Yamazoe, Tokyo, Mitsuyuki Hoshino, Urawa, and Sadafumi Yoshino, Sosaizuka, Japan, assignors to Nippon Soda Co., Ltd., Tokyo, Japan
No Drawing. Filed Dec. 4, 1972, Ser. No. 312,110
Claims priority, application Japan, Dec. 14, 1971, 46/100,707
Int. Cl. C07c 121/20
U.S. Cl. 260—465.5 R                    5 Claims

ABSTRACT OF THE DISCLOSURE

A process for producing diaminomaleonitrile i.e., tetramer of hydrogen cyanide, comprises polymerizing hydrogen cyanide in the presence of a solvent hexa-alkyl-phosphoramide such as hexa-methyl- and/or hexa-ethyl-phosphoramide and an alkali-cyanide catalyst, wherein the molar ratio of the catalyst to hydrogen cyanide is below 0.25, at a temperature range of 0° to 100° C. under atomospheric pressure in a reactor having an agitator.

BACKGROUND OF THE INVENTION

The present invention relates to a novel process for producing diaminomaleonitrile, that is, tetramer of hydrogen cyanide. Diaminomaleonitrile, which has the structural formula

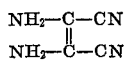

is a useful chemical product which is being watched, in recent years, in the chemical industry as a raw material for use synthesis of various organic materials, especially as a intermediate for synthesis of imidazoles.

Hitherto, it is known that the purified hydrogen cyanide or a highly concentrated hydrogen cyanide aqueous solution produces polymerization and forms a tetramer and a blackish amorphous polymer product and in that occasion, a high calorie of polymerization heat is generated.

For the sake of inhibiting said polymerization, the purity of hydrogen cyanide is hightened and there is added a little sulphuric acid, phosphoric acid or sulphur dioxide in an amount of below 0.1 percent as stabilizer.

According to the literature, Ann. *81*, 600 (1956), diaminomaleonitrile is obtained by a yield of 25.4 percent by passing hydrogen cyanide through a layer packed with fillers such as alumina, silica or other trivalent or tetravalent basic oxide in the course of 20 to 24 hours at a temperature ranging from 0° to 100° C.

According to German Pat. No. 2,022,243, diaminomaleonitrile is obtained by a yield of 37 to 64 percent by polymerizing hydrogen cyanide in a solvent of dimethylsufoxide or dimethylformamide, using basic materials such as sodium cyanide or sodium hydroxide as catalyst and keeping a pH value of reaction system at 10±1.

Furthermore, according to Japanese Pat. No. 2917/1971, diaminomaleonitrile is obtained by a yield of 16 to 63 percent by polymerizing hydrogen cyanide using a basic catalyst, for example, trimethylamine, and a co-catalyst which comprises abovementioned basic catalyst with at least one kind of cyan or di-imino-succinonitrile, at a temperature of about —40° to 25° C.

As described above, diaminomaleonitrile is obtained in a low yield and therefore expensive, and consequently, glycine, 4-amino-imidazole-5-carboxyimide, adenine, 1,3,7-trimethylxanthine, hypoxanthine or guanine, or useful amino acids such as inosinic acid or nucleic acid which are synthesized from the said diaminomaleonitrile become also expensive and are extremely deficient from the economical standpoint.

SUMMARY OF THE INVENTION

The inventors relating to the present invention carried out various research on an advantageous process for removing the above drawback as a result of the research, the inventors found a solvent, hexa-alkyl-phosphoramide, which is a polar non-protonic solvent and has a high basic property, as the most suitable solvent to obtain diaminomaleonitrile with a high yield.

And the inventors accomplished the present invention by finding the fact that the diaminomaleoitrile can be obtained with most high yield by using hexa-alkyl-phosphoramide as a solvent and using an alkali-cyanide as a catalyst and adopting the molar ratio of alkali-cyanide to hydrogen cyanide used as a raw material to below 0.25.

The present invention is thus a novel process for producing diaminomaleonitrile, i.e., the tetramer of hydrogen cyanide, comprising polymerizing hydrogen cyanide under the abovementioned conditions at a temperature of 0° to 100° C.

As a condition for obtaining diaminomaleonitrile in a high yield, the following condition is important, that is, the formation velocity of tetramer from hydrogen cyanide is accelerated and therewith a side reaction velocity of polymer product from the tetramer is depressed.

Generally speaking, the following three conditions are necessary, (1) a catalyst, alkali-cyanide, is solvated by the solvent and dissociates and then it works as cyan ion CN⁻.
(2) hydrogen cyanide which is a raw material dissolves well into the solvent and it works as diluted hydrogen cyanide.
(3) the solvent which is used in the reaction also has the solution property to tetramer and polymer product which are formed by the reaction (polymerization).

On the basis of three conditions mentioned above, cyano-property of dissolving the tetramer and the polymer products to the product of "the cyan ion concentration X hydrogen cyanide concentration," is effectively increased and the side reaction from the tetramer to the polymer product is depressed.

Hereinafter, the present invention is minutely explained. The solvent relating to the present invention, that is hexa-alkyl-phosphoramide has a general formula $[R_2N]_3P=O$, wherein R shows lower alkyl group.

And especially, preferable hexa-alkyl-phosphoramide is a hexa-methyl-phosphoramide (hereinafter hexa-methyl-phosphoramide is abbreviated as HMPA) and hexa-ethyl-phosphoramide (hereinafter hexa-ethyl-phosphoramide is abbreviated as HEPA).

The catalyst relating to the present invention is a alkali-cyanide such as potassium cyanide, sodium cyanide and/or the like.

In the present invention, the concentration of the alkali-cyanide catalyst is not especially limited, however, ordinarily the molar ratio of the catalyst to hydrogen cyanide, which is used as a raw material, is below 0.25, and preferably in the range of 0.05 to 0.15.

And further, the pressure which is kept in the present invention is not a limited factor, ordinarily the present invention is carried out under atmospheric pressure.

Next, with reference to the reaction temperature, the reaction temperature affects the main reaction velocity from hydrogen cyanide to the tetramer and the side reaction velocity from the tetramer to the polymer product, however, in the present invention the reaction temperature can be in the range of 0° to 100° C., and if a suitable temperature is employed the reaction is completely finished in the course of 3 to 10 hours.

According to the process of the present invention, the diamino-maleonitrile can be obtained in yields of 65–72 weight percent.

For the purpose of giving those skilled in the art a better understanding of the invention, the following illustrative examples are given.

Example 1

267 ml. of solvent, i.e., HMPA, was charged in a reactor having 500 ml. of volume capacity and an agitator at ordinary temperature, and then, under stirring, 13 g. of sodium cyanide was added and dissolved.

Next, 122 ml. (87.5 g.) of hydrogen cyanide was gradually added and therewith the temperature was also gradually raised to 70° C. and kept during 6 hours at that temperature.

After the reaction finished, the reaction solution was diluted by adding hot water and then the blackish amorphous polymer product deposited was removed by filtration.

The filtrate was analyzed by ultraviolet absorbing photometric analysis (at 296 m$\mu$ wavelength). As a result of analysis, it was 62.4 g. of diamino-maleonitrile was obtained. This yields corresponded to show that 71 weight percent on the basis of added hydrogen cyanide.

Example 2

261 ml. of HMPA and 5.9 g. of potassium cyanide were charged in the reactor having 500 ml. of volume capacity as in Example 1. And then 56 ml. (40.2 g.) of hydrogen cyanide was gradually added and the reaction was carried out during 6 hours at a temperature of 70° C.

After the reaction was finished, the reaction solution was treated as in Example 1 and as the result of analysis by ultraviolet absorbing photometric analysis (at 296 m$\mu$ wavelength) it was shown that 28.0 g. of diaminomaleonitrile was obtained.

This yields corresponded to 70 weight percent on the basis of added hydrogen cyanide.

Example 3

261 ml. of HMPA and 7.5 g. of sodium cyanide were charged in the reactor having 500 ml. of volume capacity as in Example 1. And then 56 ml. (40.2 g.) of hydrogen cyanide was gradually added and the reaction was carried out during 7 hours at a temperature of 70° C.

After the reaction finished, the reaction terminated solution was treated as in Example 1 and as the result of analysis by ultraviolet absorbing photometric analysis (at 296 m$\mu$ wavelength) 28.9 g. of diaminomaleonitrile was obtained. This yields corresponded to yield of 72 weight percent on the basis of added hydrogen cyanide.

Example 4

261 ml. of HMPA and 11.0 g. of sodium cyanide were charged in the reactor having 500 ml. of volume capacity as in Example 1. And then 56 ml. (40.2 g.) of hydrogen cyanide was gradually added and the reaction was carried out during 6 hours at a temperature of 70° C.

After the reaction finished, the reaction solution was treated as in Example 1 and as a result of analysis by ultraviolet absorbing photometric analysis (at 296 m$\mu$ wavelength) it was shown that 27.8 g. of diaminomaleonitrile was obtained.

This yields corresponded to yield of 69 weight percent on the basis of added hydrogen cyanide.

What we claim is:

1. A process for producing diaminomaleonitrile comprising the steps of:
   (a) mixing an alkali-cyanide catalyst material selected from the group consisting of sodium and potassium-cyanide into a hexa-alkyl-phosphoramide solvent selected from the group consisting of hexa-methyl and hexa-ethyl-phosphoramide at room temperature;
   (b) gradually adding hydrogen cyanide, raising the temperature to about 70° C. and maintaining the mixture for about six hours, the molar ratio of the alkali-cyanide to the hydrogen cyanide being below 0.25;
   (c) diluting the solution with hot water; and,
   (d) removing the blackish amorphous polymer product by filtration.

2. A process as claimed in claim 1, wherein the hexa-alkyl-phosphoramide is hexa-methyl-phosphoramide.

3. A process as claimed in claim 1, wherein the hexa-alkyl-phosphoramide is hexa-ethyl-phosphoramide.

4. A process as claimed in claim 1, wherein the molar ratio of alkali-cyanide to hydrogen cyanide is in the range of 0.05 to 0.15.

5. A process as claimed in claim 1, wherein the polymerization temperature is in the range of 0° to 100° C.

References Cited

UNITED STATES PATENTS

| | | | |
|---|---|---|---|
| 3,701,797 | 10/1972 | Okada et al. | 260—465.5 R |
| 3,666,787 | 5/1972 | Webster | 260—465.5 R |
| 3,564,039 | 2/1971 | Webster | 260—465.5 R |
| 3,629,318 | 12/1971 | Webster | 260—465.5 R |
| 3,427,322 | 2/1969 | Argabright et al. | 260—465.6 X |

JOSEPH P. BRUST, Primary Examiner